United States Patent
Attaluri et al.

(10) Patent No.: US 10,572,462 B2
(45) Date of Patent: *Feb. 25, 2020

(54) EFFICIENT HANDLING OF SORT PAYLOAD IN A COLUMN ORGANIZED RELATIONAL DATABASE

(71) Applicant: International Business Machines Corporation, Armonk, NY (US)

(72) Inventors: Gopi K. Attaluri, San Jose, CA (US); Vijayshankar Raman, Sunnyvale, CA (US); David C. Sharpe, Catharines (CA)

(73) Assignee: International Business Machines Corporation, Armonk, NY (US)

(*) Notice: Subject to any disclaimer, the term of this patent is extended or adjusted under 35 U.S.C. 154(b) by 991 days.

This patent is subject to a terminal disclaimer.

(21) Appl. No.: 15/095,080

(22) Filed: Apr. 10, 2016

(65) Prior Publication Data

US 2017/0293468 A1 Oct. 12, 2017

(51) Int. Cl.
*G06F 16/22* (2019.01)
*G06F 7/24* (2006.01)

(52) U.S. Cl.
CPC ............ *G06F 16/221* (2019.01); *G06F 7/24* (2013.01)

(58) Field of Classification Search
CPC .. G06F 16/284; G06F 16/221; G06F 16/1744; G06F 16/2237; G06F 16/2455; G06F 16/283; G06F 16/288; G06F 16/2282; G06F 16/2228; G06F 16/24534
USPC ................................................ 707/752, 753
See application file for complete search history.

(56) References Cited

U.S. PATENT DOCUMENTS

| 8,868,484 B2 | 10/2014 | Aggarwal |
| 9,043,310 B2 | 5/2015 | Liu et al. |
| 10,387,414 B2* | 8/2019 | Isaacson ............ G06F 16/24542 |
| 10,394,848 B2* | 8/2019 | Gupta .................... G06F 16/283 |
| 2008/0263106 A1 | 10/2008 | Asherman et al. |

(Continued)

OTHER PUBLICATIONS

List of IBM Patents or Patent Applications Treated as Related.
(Continued)

*Primary Examiner* — James Trujillo
*Assistant Examiner* — Fariborz Khoshnoodi
(74) *Attorney, Agent, or Firm* — North Shore Patents, P.C.; Michele Liu Baillie

(57) ABSTRACT

A system for sorting in a column organized relational database by sorting only key columns in the column organized relational database to reduce memory and CPU usage. The sort may be performed using an in memory sort. After sorting the key columns, the system orders a payload column according to an order indicated by the key columns. The payload column is associated with the key columns in the column organized relational database. The system assesses memory capacity prior to ordering the payload column. Prior to ordering a plurality of payload columns, the system refrains from automatically concatenating the plurality of payload columns, and refrains from automatically de-concatenating any concatenated payload columns after the ordering the plurality of payload columns. The system determines an amount of required memory necessary to order the payload column, and detects an amount of available memory accessible to order the payload column.

8 Claims, 3 Drawing Sheets

(56) References Cited

U.S. PATENT DOCUMENTS

2009/0292704 A1* 11/2009 Chen .................... G06F 16/244
2013/0117255 A1*  5/2013 Liu ..................... G06F 16/2456
                                                            707/714

OTHER PUBLICATIONS

Anonymously; "An algorithm for relational database table reorganization"; http://ip.com/IPCOM/000244381; Dec. 8, 2015.
Graefe, G.; "Fast loads and fast queries"; Data Warehousing and Knowledge Discovery. Proceedings 11th International Conference, DaWak 2009, pp. 111-124; 2009.
IBM; "Multiple-Column Sorting Controls"; http://ip.com/IPCOM/000013937; Feb. 1, 2001.

* cited by examiner

| Sorted key column | Original row number of payload column | New row number of payload column |
|---|---|---|
| 3 | 0 | 4 |
| 5 | 1 | 3 |
| 2 | 2 | 2 |
| 1 | 3 | 0 |
| 0 | 4 | 5 |
| 4 | 5 | 1 |

FIG. 2

EFFICIENT HANDLING OF SORT PAYLOAD IN A COLUMN ORGANIZED RELATIONAL DATABASE

BACKGROUND

Some relational database management systems (DBMS) store data in column organized storage formats. A column organized relational database may execute queries to process data. The queries may include the SORT query operation to sort data in the column organized relational database. Implementing the SORT query operation in a column organized relational database is challenging because the SORT query operation involves high CPU and memory utilization. Additionally, if there is not enough memory, the SORT query operation "spills" to disk storage, using more system resources and requiring complex algorithms. Therefore, it would be helpful to have an improved process to sort data in a column organized relational database.

SUMMARY

According to an embodiment of the present invention, in a method for sorting in a column organized relational database, the method sorts only key columns in the column organized relational database to reduce memory and CPU usage, where the sort may be performed using an in memory sort. After sorting the key columns, the method orders a payload column according to an order indicated by the key columns, where the payload column is associated with the key columns in the column organized relational database. The method assesses memory capacity prior to ordering the payload column.

When the method orders the payload column according to an order indicated by the key columns, prior to ordering a plurality of payload columns, the method refrains from automatically concatenating the plurality of payload columns. After the ordering the plurality of payload columns, the method refrains from automatically de-concatenating any concatenated payload columns.

When the method assesses memory capacity prior to ordering the payload column, the method determines an amount of required memory necessary to order the payload column and detects an amount of available memory accessible to order the payload column.

In an example embodiment, the method determines a plurality of payload columns that may be ordered concurrently based the required memory and the available memory. The method detects a plurality of agents each available to perform at least one of the sorting and the ordering. The method then orders the plurality of payload columns concurrently, where each of the plurality of payload columns is ordered individually by at least one of the plurality of agents. The method determines a maximum parallelism for ordering the plurality of payload columns based on a column width of each of the plurality of payload columns, and a relative cost of performing the ordering.

In an example embodiment, the method assesses an amount of anticipated memory that will be accessible at a time during which the plurality of payload columns are ordered. The method determines the plurality of payload columns that may be ordered concurrently based on the available or anticipated memory. The method then determines a sequence in which the plurality of payload columns may be ordered based on the anticipated memory.

In an example embodiment, the method determines that the amount of required memory is greater than the amount of available memory, and spills to disk the ordering of the payload column using a spill sort to sort the key columns.

In an example embodiment, when the method orders the payload column according to an order indicated by the key columns, prior to ordering a plurality of payload columns, the method determines whether to order the payload columns concurrently or whether to concatenate the plurality of payload columns, and then de-concatenate the payload columns after the ordering of the payload columns. The method makes this determination based on a cost of the ordering, the available memory, the possible parallelism of the ordering method, a number of available agents, etc.

When the method orders a payload column according to an order indicated by the key columns, the method determines a consumption order in which a user will consume a plurality of payload columns. The method then performs an ordering of each of the plurality of payload columns according to the consumption order.

BRIEF DESCRIPTION OF THE DRAWINGS

FIG. 2 illustrates an example ordering of a payload column based on sorted key columns.

DETAILED DESCRIPTION

Figure 1:
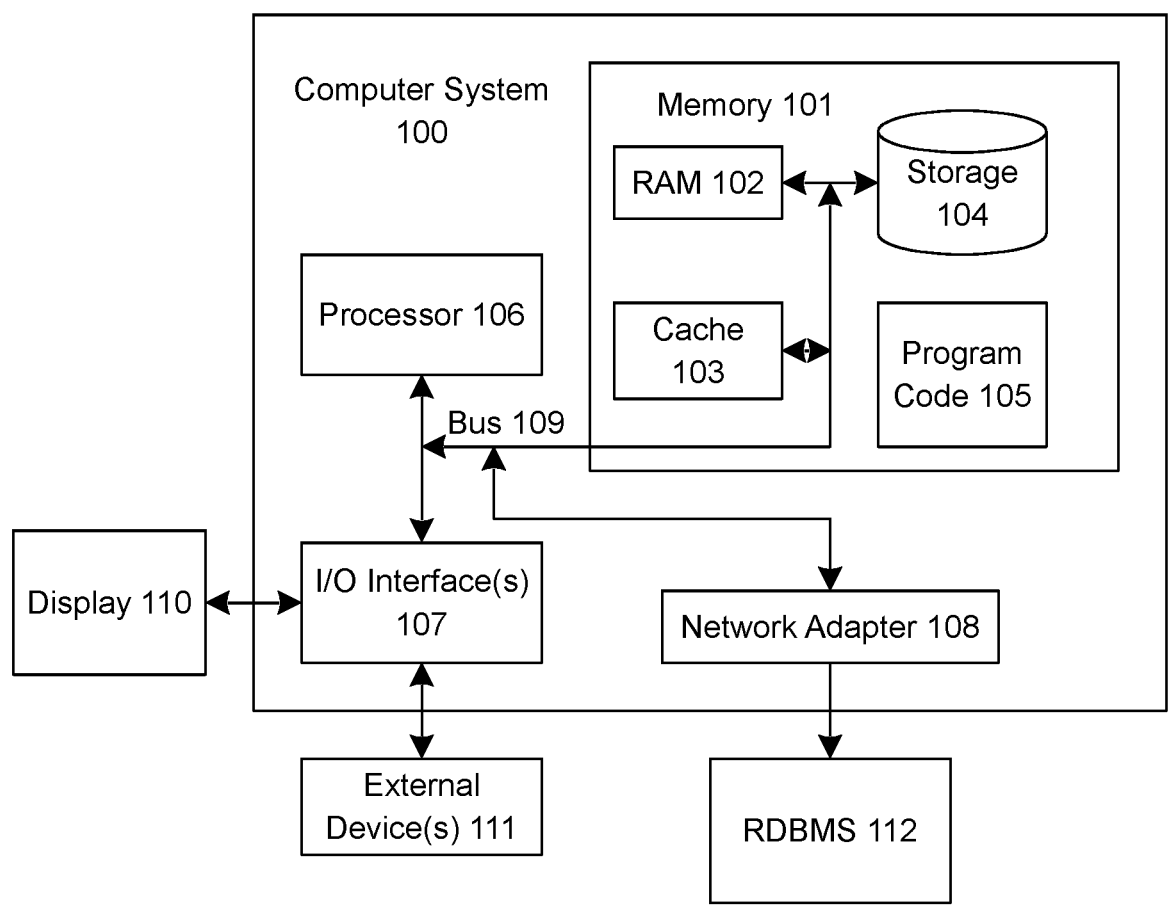
FIG. 1 illustrates an embodiment of a system for sorting in a column organized relational database, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for sorting in a column organized relational database according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

FIG. 2 illustrates an example ordering of a payload column based on sorted key columns. The original row numbers of the payload column are row 0 through row 5. After the key columns are sorted, the payload column is ordered according to the sorted key columns. In this example, after the key column is sorted, the order of the key column is {3, 5, 2, 1, 0, 4}. The payload column is then ordered according to the sorted key column. Thus, the original order of the payload column rows {0, 1, 2, 3, 4, 5} is ordered to be {4, 3, 2, 0, 5, 1}.

Figure 3:
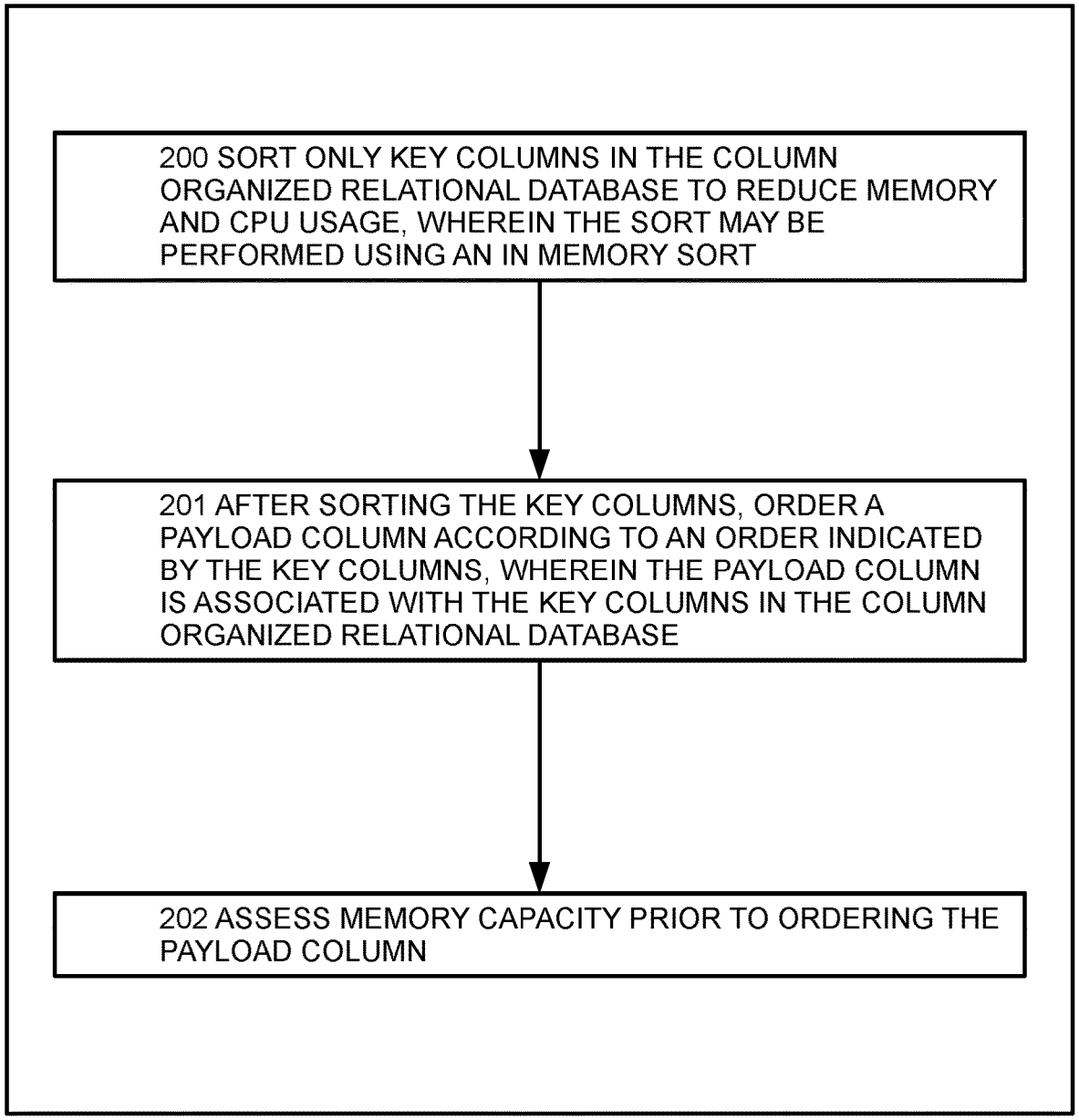
FIG. 3 is a flowchart illustrating an embodiment of a method for sorting in a column organized relational database, according to embodiments disclosed herein.

FIG. 3 illustrates an embodiment of a method for sorting in a column organized relational database. Most relational DBMS store data in rows. A column organized relational database stores data tables as sections of columns of data rather than as rows of data. Existing SORT query operations are suited for row organized relational databases, and are not best suited for column organized relational databases. At 200, when performing a SORT query operation, the method sorts only key columns in the column organized relational database. In terms of usage of system resources, the SORT is an expensive operation that involves high CPU usage and memory usage. Memory constraints and I/O costs are major factors in sort algorithms. The method sorts only the key columns to reduce memory and CPU usage, and the sort may be performed using an in memory sort. Normally, if there is not enough memory available, the SORT query operation "spills" to disk, requiring disk storage, complex algorithms and more system resources. In an example embodiment, the sort is more likely to be performed using an in-memory sort when compared to sorting both key columns and payload columns together. In another example embodiment, when the method sorts the key columns, the sort "spills" to disk. Thus, by sorting only the key columns, the method reduces the size of the SORT query operation, more specifically the method reduces the amount of memory needed to complete the SORT query operation. This results in a SORT query operation that performs better because there is a reduced likelihood that the SORT query operation will spill to disk, and instead, the SORT query operation is more likely to be performed in memory. In an example embodiment, an in memory SORT query operation may be processed using a "fast" in memory parallel sort algorithm that is significantly faster than if the same SORT query operation were to spill to disk.

At 201, after sorting the key columns, the method orders a payload column according to an order indicated by the key columns. The payload column is associated with the key columns in the column organized relational database. The payload column may be the result of the SORT query operation. Both memory and CPU cycles are reduced by sorting only the key columns, and ordering each payload column independently after sorting the key columns. Each individual payload column is maintained in column organized format. The benefit of sorting only the key columns becomes even more important when multiple SORT query operations share the same payload columns. In an example embodiment, there may be multiple key columns. As noted above, the key columns are sorted using an efficient sort-algorithm. After the key columns are sorted, the key columns indicate the required permutation for the payload column values. As illustrated in FIG. 2, if a sorted key column is ordered as "{3, 5, 2, 1, 0, 4}", then the payload column values for the rows 0 to 5 need to be reordered. The sorted key column contains "{3, 5, 2, 1, 0, 4}, meaning original row 3 is now in the row 0 position, original row 5 is now in the row 1 position, original row 2 remains in the row 2 position, original row 1 is now in the row 3 position, original row 0 is now in the row 4 position, and original row 4 is now in the row 5 position. Thus, the original order of the payload column rows {0, 1, 2, 3, 4, 5} is ordered to be {4, 3, 2, 0, 5, 1}.

In another example embodiment, the method adds meta data to one or more key columns in the column organized relational database to create extended key columns. An extended key column comprises a permutation column and the key column, where the permutation column comprises the meta data. The method sorts the extended key columns. After sorting the extended key columns, the method orders a payload column according to an order indicated by the permutation column. In an example embodiment, there may be multiple payload columns. The method may order the payload columns separately, optimizing memory usage, especially in a memory constrained system. They payload columns are not included in the SORT query operation, saving on CPU cycles and memory usage.

At 202, the method assesses memory capacity prior to ordering the payload column. In an example embodiment, to optimize the SORT query operation in the column organized relational database, the method assesses memory capacity, such as available memory, how much memory is required to perform the SORT query operation, the sequence of ordering payload columns, etc., prior to ordering the payload column.

In an example embodiment, when the method orders the payload column according to an order indicated by the key columns, prior to ordering a plurality of payload columns, the method refrains from automatically concatenating the plurality of payload columns. In one example embodiment, the method refrains from concatenating all of the payload columns. The method also refrains from automatically de-concatenating any concatenated payload columns after the ordering of the plurality of payload columns. In one example embodiment, the method also refrains from automatically de-concatenating all of the payload columns. Typically, with column organized relational databases, all the payload columns are automatically concatenated together, the SORT query operation is performed, and then the columns are automatically de-concatenated. According to embodiments disclosed herein, the method optimizes the SORT query operation by refraining from automatic concatenation (prior to ordering a plurality of payload columns), and refraining from automatic de-concatenation (after ordering the plurality of payload columns). This results in several benefits. The concatenation, de-concatenation and extraction costs are avoided (concatenating payload columns significantly increases memory utilization, and also increases the chances that the ordering/sorting process will "spill" to disk). The extraction costs may be reduced or eliminated all together. Each payload column may be sorted separately from other payload columns. This helps optimize memory management. For example, the number of payload columns to order may be determined based on the available memory. Each payload column may be independently ordered by one or more agents. This reduces the degree of parallelism (i.e., the number of threads working on the ordering operation), and increases the scalability of the SORT query operation. The SORT query operation is optimized by the agents ordering each payload column independently of the other payload columns without the need to cooperate and coordinate among the agents. Additionally, when the method requests memory required for performing the ordering/sorting of the payload column, the method is more likely to receive the amount of memory required than if the method requested memory for the duration of the entire query. Even if only a small amount of memory is available, the method only needs one payload column to fit in memory at any given time. In an example embodiment, the method only needs to sort a single payload column efficiently based on the sorted order of the key columns. The in memory sort is less likely to happen if all of the payload columns are sorted together. In another example embodiment, a subset of payload columns are ordered/sorted together if their concatenated data can be sorted efficiently in memory and/or if a the subset of payload columns will be needed, for example, by a user at the same period of time. These decisions may also be based on factors such as the cost of concatenation, available memory, order of accessing the payload columns, number of agents/CPUs, possible parallelization of this sort operation, etc. These factors may be used to determine if a subset of payload columns should be concatenated and sorted together.

In an example embodiment, when the method assesses memory capacity prior to ordering the payload column, the method determines an amount of required memory necessary to order the payload column, and detects an amount of available memory accessible to order the payload column. For example, the method determines how many payload columns can be ordered concurrently (without spilling to disk) based on the available memory. The number of payload columns to be ordered may be entirely determined by the available memory. The method makes this assessment prior to ordering the payload column(s). The method also determines the parallelism for each ordering/sorting process prior to ordering the payload columns. If the amount of data to be ordered/sorted can be reduced, the chances of spilling are reduced, and the SORT query operation may perform more efficiently.

In an example embodiment, the method determines a plurality of payload columns that may be ordered concurrently based the required memory and the available memory. Typically, there is more than one column to order. Prior to ordering the plurality of payload columns, the method may determine that a plurality of payload columns may be ordered concurrently based on the required memory and available memory. In an example embodiment, the method may concatenate a subset of the plurality of payload columns based on the amount of available memory. In other words, the method may concatenate the subset of payload columns to fill the available amount of memory. In another example embodiment, when memory is available to sort a subset of payload columns together, it may be more expensive to sort each column individually. In this scenario, the payload columns may be concatenated, ordered/sorted together, and then de-concatenated.

In an example embodiment, the method detects a plurality of agents each available to perform at least one of the sorting and the ordering. The method takes into account the number of agents available to perform the ordering to determine how many payload columns can be sorted concurrently. The method also determines the maximum parallelism for each sort. The degree of maximum parallelism for each sort may depend on the column width and the cost/speed of copying the values. The method then orders the plurality of payload columns concurrently where each of the plurality of payload columns is ordered individually by at least one of the plurality of agents. More than one payload column may be ordered by an individual agent, and an individual payload column, for example, a particularly wide payload column, may be ordered by more than one agent. The availability of agents to perform the sorting/ordering reduces the degree of parallelism (i.e., the number of threads working on the ordering process), and increases the scalability.

In an example embodiment, the method determines a maximum parallelism for ordering the plurality of payload columns based on a column width of each of the plurality of payload columns, and a relative cost of performing the ordering. The method may order multiple columns in parallel, and those columns may be processed on multiple cores (where a processor may have multiple cores). In other words, the method may use multi-core parallelism to order the plurality of payload columns. This allows the method to customize the number of payload columns that are ordered at the same time. The method may also customize the degree of parallelism for each of those ordering processes to maximize the scalability. With typical sort algorithms, the scalability becomes more difficult with increased parallelism. Because the method may order/sort the payload columns by different threads (almost independently of each other), the scalability can be significantly improved. Additionally, each thread produces outputs in sequential order (as opposed to random writes). The method optimizes the processing of the SORT query operation based on memory availability and/or based on the number of CPU cores.

In an example embodiment, the method assesses an amount of anticipated memory that will be accessible at a time during which the plurality of payload columns are ordered. The method then determines the plurality of payload columns that may be ordered concurrently based on the available or anticipated memory. The method also determines a sequence in which the plurality of payload columns may be ordered based on the anticipated memory. Traditionally, a fixed memory budget is given upfront, and dedicated forever (resulting in pessimistic memory allocations). Typically, memory availability changes dynamically. The method may determine whether more or less memory will be available during the time period in which the column ordering process occurs, and adapt/adjust the SORT query operation dynamically based on the memory availability, specifically, future memory availability. For example, if the method determines that the maximum amount of possible memory is available currently, future availability will stay the same, or more likely, be reduced. In this scenario, the method may order all the payload columns immediately. If the method determines that memory availability is likely to improve in the future, then the method may order those payload columns that are immediately required, and the remaining payload columns may be ordered, on demand, at a future point in time.

In an example embodiment, the method determines the amount of required memory is greater than the amount of available memory, and spills to disk the ordering of the payload column using a spill sort to sort the key columns. In an example embodiment, the method identifies those payload columns that can be ordered in parallel within the available memory (without spilling to disk), and determines the parallelism for each ordering/sorting of the payload columns. The remaining payload columns are ordered either at the same time, or later (on demand) depending on various factors (for example, memory requirements and availability, agents available to perform the sort, the order in which the payload columns will be consumed, size of payload columns, multi-core parallelism factors, etc.). If any payload column cannot be ordered within the available memory, the method spills the sort to disk to complete the ordering of the payload column.

In an example embodiment, when the method orders a payload column according to an order indicated by the key columns, the method determines a consumption order in which a user will consume a plurality of payload columns, and performs an ordering of each of the plurality of payload columns according to the consumption order. For example, the method may determine that a subset of the plurality of payload columns may be consumed immediately (for example, to perform a computation), and then the remaining payload columns of the plurality of payload columns may be consumed. The method will take into account this consumption order when determining when and how the payload columns are ordered. The payload columns are stored separately in column vectors, and therefore, may be sorted on demand, independent of other payload columns. In an example embodiment, the method orders the payload column, on demand, when a consumer of the SORT query operation requires the payload column data.

The method also optimizes the handling of large payload columns, which typically are processed inefficiently. Variable Character Field (varchar) columns are common, due to text data and/or compression. The methods by which a varchar column is compared and copied may have a negative impact on system performance. The method orders/sorts varchar payload columns to minimize or avoid random memory access writes (which tend to be much more expensive in terms of system resources than random reads). Additionally, for each payload column, the method fills the output vector sequentially, based on the sorted key columns. The sequential output results in sequential memory writes which are highly desirable for a wide payload column.

In an example embodiment, when the method orders the payload column according to an order indicated by the key columns, prior to ordering a plurality of payload columns, the method determines whether to order the payload columns concurrently or whether to concatenate the plurality of payload columns, and then de-concatenate the payload columns after the ordering of the payload columns. The method makes this determination based on a cost of the ordering, the available memory, the possible parallelism of the ordering method, a number of available agents, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for sorting in a column organized relational database, the computer program product comprising: a computer readable storage medium having computer readable program code embodied therewith, the program code executable by a computing processor to: sort only key columns in the column organized relational database to reduce memory and CPU usage, wherein the sort may be performed using an in memory sort; after sorting the key columns, order a payload column according to an order indicated by the key columns, wherein the payload column is associated with the key columns in the column organized relational database, comprising: prior to ordering a plurality of payload columns, refrain from automatically concatenating the plurality of payload columns; and refrain from automatically de-concatenating any concatenated payload columns after the ordering the plurality of payload columns; and assess memory capacity prior to ordering the payload column.

2. The computer program product of claim 1 wherein the computer readable program code configured to assess memory capacity prior to ordering the payload column is further configured to: determine an amount of required memory necessary to order the payload column; and detect an amount of available memory accessible to order the payload column.

3. The computer program product of claim 2 further configured to: determine the plurality of payload columns may be ordered concurrently based the required memory and the available memory.

4. The computer program product of claim 3 further configured to: detect a plurality of agents each available to perform at least one of the sorting and the ordering; and order the plurality of payload columns concurrently wherein each of the plurality of payload columns is ordered individually by at least one of the plurality of agents.

5. A system comprising: a computing processor; and a computer readable storage medium operationally coupled to the processor, the computer readable storage medium having computer readable program code embodied therewith to be executed by the computing processor, the computer readable program code configured to: sort only key columns in the column organized relational database to reduce memory and CPU usage, wherein the sort may be performed using an in memory sort; after sorting the key columns, order a payload column according to an order indicated by the key columns, wherein the payload column is associated with the key columns in the column organized relational database, comprising: prior to ordering a plurality of payload columns, refrain from automatically concatenating the plurality of payload columns; and refrain from automatically de-concatenating any concatenated payload columns after the ordering the plurality of payload columns; and assess memory capacity prior to ordering the payload column.

6. The system of claim 5 wherein the computer readable program code configured to assess memory capacity prior to ordering the payload column is further configured to: determine an amount of required memory necessary to order the payload column; and detect an amount of available memory accessible to order the payload column.

7. The system of claim 6 further configured to: determine the plurality of payload columns may be ordered concurrently based the required memory and the available memory.

8. The system of claim 7 further configured to: detect a plurality of agents each available to perform at least one of the sorting and the ordering; and order the plurality of payload columns concurrently wherein each of the plurality of payload columns is ordered individually by at least one of the plurality of agents.

* * * * *